United States Patent
Hwang et al.

(10) Patent No.: US 7,911,917 B2
(45) Date of Patent: Mar. 22, 2011

(54) RECORDING/REPRODUCING METHOD, RECORDING/REPRODUCING APPARATUS AND HOLOGRAPHIC INFORMATION STORAGE MEDIUM

(75) Inventors: Sung Hee Hwang, Suwon-si (KR); Jin-Han Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 587 days.

(21) Appl. No.: 11/944,729

(22) Filed: Nov. 26, 2007

(65) Prior Publication Data

US 2008/0205238 A1    Aug. 28, 2008

(30) Foreign Application Priority Data

Feb. 23, 2007    (KR) .................. 10-2007-0018513

(51) Int. Cl.
*G03H 1/00*    (2006.01)
(52) U.S. Cl. ........................................................ 369/103
(58) Field of Classification Search .................. None
See application file for complete search history.

(56) References Cited

U.S. PATENT DOCUMENTS

| | | | | |
|---|---|---|---|---|
| 3,761,155 A | * | 9/1973 | Lo et al. ............................ | 359/21 |
| 3,930,231 A | * | 12/1975 | Henrichon et al. ............ | 382/207 |
| 4,260,858 A | * | 4/1981 | Beiser ............................ | 369/103 |
| 6,473,876 B1 | * | 10/2002 | Kondo et al. ................. | 714/746 |
| 7,092,342 B2 | * | 8/2006 | Nagai et al. ................. | 369/59.25 |
| 7,414,941 B2 | * | 8/2008 | Uchida ....................... | 369/59.23 |
| 7,433,289 B2 | * | 10/2008 | Lee et al. ..................... | 369/59.23 |
| 2004/0130996 A1 | * | 7/2004 | Reiter et al. ................ | 369/59.24 |
| 2006/0072440 A1 | * | 4/2006 | Lambert et al. ............ | 369/275.1 |
| 2007/0091767 A1 | * | 4/2007 | Liedenbaum ................ | 369/103 |
| 2007/0195675 A1 | * | 8/2007 | Lee et al. ..................... | 369/59.22 |
| 2007/0237059 A1 | * | 10/2007 | Kasahara ..................... | 369/124.1 |

FOREIGN PATENT DOCUMENTS

| | | |
|---|---|---|
| JP | 2005-190636 | 7/2005 |
| JP | 2005-251421 | 9/2005 |
| KR | 2005-98757 | 10/2005 |
| KR | 10-728819 | 6/2007 |

OTHER PUBLICATIONS

Machine translation of Hayashi, KR 10-0584607 B1, published May 30, 2006.*
International Search Report and Written Opinion issued in corresponding International Application No. PCT/KR2008/000346 dated Apr. 25, 2008.

* cited by examiner

*Primary Examiner* — Peter Vincent Agustin
(74) *Attorney, Agent, or Firm* — NSIP Law (57) ABSTRACT

A recording/reproducing method and recording/reproducing apparatus, which use an information storage medium by adaptively preparing a standard for distinguishing bit 0 from bit 1 of data read from a holographic information storage medium, and a holographic information storage medium. At least one record unit data is recorded on the holographic information storage medium. The record unit data is divided into at least one sub area, and information about the distribution of bits included in the sub area is arranged in the sub area.

27 Claims, 9 Drawing Sheets

RECORDING/REPRODUCING METHOD, RECORDING/REPRODUCING APPARATUS AND HOLOGRAPHIC INFORMATION STORAGE MEDIUM

CROSS-REFERENCE TO RELATED PATENT APPLICATION

This application claims the benefit of Korean Patent Application No. 2007-18513, filed Feb. 23, 2007, in the Korean Intellectual Property Office, the disclosure of which is incorporated herein in its entirety by reference.

BACKGROUND OF THE INVENTION

1. Field of the Invention

An aspect of the present invention relates to a recording/reproducing method and recording/reproducing apparatus which uses an information storage medium by adaptively preparing a standard for distinguishing bit 1 from bit 0 of data read from a holographic information storage medium, and a holographic information storage medium for use with the apparatus.

2. Description of the Related Art

In optical holography, data is not stored on the surface of a recording medium but, rather, in a volume thereof. A signal beam interferes with a reference beam within the recording medium, generating a plurality of interference gratings referred to as a data page. The interference gratings overlap with each other by changing the optical characteristics of the reference beam. This process is referred to as multiplexing. When data is read from the recording medium, a single reference beam is irradiated onto the recording medium under the same conditions as used during the data recording, generating a diffraction beam indicating the stored data page. The diffraction beam is detected by a detection array, which extracts a plurality of stored data bits from a measured intensity pattern. The data page contains the data bits or pixels. When the data pages overlap in the volume of the recording medium, data storage capacity is increased.

Recording in a holographic information storage medium is carried out as a result of interference between a signal beam and a reference beam. The signal beam for recording is produced by a spatial light modulator in the form of a page comprised of a plurality of pixels. The signal beam is transmitted into an optical system and interferes with the reference beam in the holographic information storage medium. An interference pattern produced by the interference is recorded in the holographic information storage medium. Reproduction is carried out by diffraction when the reference beam is radiated onto the recorded interference pattern.

A Reed-Solomon (RS) code, used as an error correction code in a conventional optical storage such as a CD, DVD, HD DVD, Blu-ray disc, or the like, performs error correction by receiving a hard value, i.e. a plurality of bits (symbols) which can each be 1 or 0. Recently, since high density storage of hundreds of GB or even several TB is required, an input signal related to error correction may be relatively very dense. Thus, the quality of the input signal may decrease. Accordingly, error correction codes based on soft iterative decoding, which corrects errors by receiving a soft value instead of a hard value of each bit, such as an LDPC code or a turbo code, are popular due to their enhanced error correction characteristics. According to soft interactive decoding, an input signal of an error correction code is a soft value, not a hard value, such as 1 or 0. This is called soft-in soft-out (SISO). A SISO apparatus outputs a soft value by receiving data reproduced from an information storage medium or transmitted from a transmitter. The soft value is generally output in a log likelihood rate (LLR), in which a natural log value is applied to a likelihood rate of each bit 1 and bit 0.

In order to obtain a likelihood of bit 1 and bit 0 of an input soft value for a SISO, there should be some kind of statistical standard or random standard. Such a standard of distinguishing bit 1 from bit 0 can be provided by analyzing the distribution of soft values of bit 1 and bit 0 by recording and reproducing a known bit pattern. However, the accuracy of such a standard is directly related to the signal processing capacity. Thus, if the variation of the distribution of the soft values of bit 1 and bit 0 is too large, the accuracy of the standard is low, and accordingly, the signal processing capacity deteriorates.

Generally, in conventional optical storage technologies, the standard of distinguishing bit 1 and bit 0 is not fixed due to an inter-symbol interference (ISI), and varies according to the recorded bit pattern. Also in a holographic storage system which records in page units, i.e. in a two dimensional array form, two dimensional inter-pixel interference (IPI) occurs, and, as described above, the standard of distinguishing bit 1 from bit 0 in the holographic storage system is also not fixed and differs according to a recorded bit pattern. In addition, as cross-talk increases, according to page multiplexing and book multiplexing, the quality of an input signal decreases. Also, the distribution of soft values of bit 1 and bit 0 has a large variation not only in each page but also in each sub-area of a page. Accordingly, an adaptive standard is needed to distinguish bit 1 from bit 0.

SUMMARY OF THE INVENTION

Aspect of the present invention provide a holographic information storage medium having at least one record unit data recorded thereon, the record unit data being divided into at least one sub area, wherein information about a distribution of bits included in the sub area is arranged in the sub area.

According to an aspect of the present invention, there is provided a holographic information storage medium having recorded thereon at least one record unit data, wherein the record unit data is divided into at least one sub area, and information about a distribution of bits included in the sub area is arranged in the sub area.

The information about the distribution may include known patterns determined according to information about bit 0 and bit 1 included in the sub area. The information about bit 0 and bit 1 may include rate information of bit 0 and bit 1. The known patterns may be further determined according to an address of the record unit data as well the information about the bit 0 and bit 1. Additional information including the information about bit 0 and bit 1 may be further recorded in the record unit data. The information about bit 0 and bit 1 may include rate information of bit 0 and bit 1 or number information of bit 1 and bit 0.

According to another aspect of the present invention, there is provided a recording apparatus to record data on a holographic information storage medium, the recording apparatus comprising: an optical processor that records data on the holographic information storage medium and/or reads data from the holographic information storage medium; and a controller that generates record unit data from data that is to be recorded in the holographic information storage medium, the record unit data being divided into at least one sub area, wherein information about a distribution of bits included in the sub area is arranged in the sub area, and provides the record unit data to the optical processor.

The controller may include a data generator which generates the record unit data, wherein the data generator comprises a pattern generator which generates known patterns, determined according to information about bit 0 and bit 1 included in the sub area, as the information about the distribution. The pattern generator may generate the known patterns further determined according to address information of the record unit data as well as the information about bit 0 and bit 1. The data generator may further include an additional information generator which generates additional information including the information about bit 0 and bit 1, and inserts the additional information generated by the additional information generator into the record unit data. The information about bit 0 and bit 1 may include rate information of bit 0 and bit 1 or number information of bit 1 and bit 0.

According to another aspect of the present invention, there is provided a reproducing apparatus to reproduce data from a holographic information storage medium, the reproducing apparatus comprising: an optical processor to record data on the holographic information storage medium or to read data from the holographic information storage medium; and a controller to receive record unit data, read from the holographic information storage medium and divided into at least one sub area, from the optical processor, to reproduce the record unit data, and to determine bits arranged in the sub area by referring to information about a distribution of bits included in the sub area.

The controller may include: a signal processor which extracts a soft value, showing the intensity of beam in each pixel included in the record unit data, and an address of the record unit data; a record unit data divider which extracts known patterns, determined according to information about bit 0 and bit 1 included in the sub area, as the information about the distribution from the sub area, and generates information about soft values of the bits included in the sub area using the extracted known pattern; and an ECC decoder which performs error correction decoding based on the soft values output from the record unit data divider.

The record unit data divider may include: a known pattern extractor which extracts soft values, corresponding to the known patterns, from the sub area; a noise distribution calculator which determines a distribution characteristic of soft values of bits included in the sub area by using the soft values corresponding to the known pattern; and a log likelihood rate (LLR) generator which calculates an LLR value of the soft values included in the sub area using the distribution of the soft values.

The signal processor may further extract additional information, including rate information of bit 0 and bit 1 included in the sub area, from the record unit data, and the noise distribution calculator may generate known patterns using the rate information of bit 0 and bit 1, and obtain the mean and the standard deviation of bit 0 and bit 1 included in the sub area by using soft values corresponding to the generated known patterns and the known patterns extracted from the sub area.

The controller may include: a signal processor which extracts a soft value showing the intensity of beam in each pixel included in the record unit data, and an address of the record unit data; a record unit data divider which extracts additional information, including number information of bit 0 and bit 1 included in the sub area, as information about the distribution of the soft value from the record unit data, and generates information about soft values of the bits included in the sub area using the additional information; and an ECC decoder which performs error correction decoding based on the soft values output from the record unit data divider.

According to another aspect of the present invention, there is provided a recording method of recording data on a holographic information storage medium, the recording method including: generating record unit data from data that is to be recorded in the holographic information storage medium, wherein the record unit data is divided into at least one sub area and information about a distribution of bits included in the sub area is arranged in the sub area; and recording the record unit data on the holographic information storage medium.

According to another aspect of the present invention, there is provided a reproducing method of reproducing data from a holographic information storage medium, the reproducing method including: reading record unit data, divided into at least one sub area, from the holographic information storage medium; and reproducing the record unit data by determining bits arranged in the sub area by referring to the information about a distribution of the bits included in the sub area.

According to another aspect of the present invention, there is provided a reproducing apparatus to reproduce data from a holographic information storage medium, the reproducing apparatus including: an optical processor to record data on the holographic information storage medium or to read data from the holographic information storage medium; and a controller to receive record unit data read from the holographic information storage medium and divided into at least one sub area, from the optical processor, and to reproduce the received record unit data, wherein the controller obtains a reference value, which distinguishes an on pixel from an off pixel based on a detected intensity of a beam from pixels that are arranged in the sub area, using known patterns included in the sub area.

According to another aspect of the present invention, there is provided a reproducing method of reproducing data from a holographic information storage medium, the reproducing method including: reading record unit data, divided into at least one sub area, from the holographic information storage medium; and obtaining a reference value, which can distinguish an on pixel from an off pixel from a detected intensity of beam in pixels arranged in the sub area, using known patterns included in the sub area.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
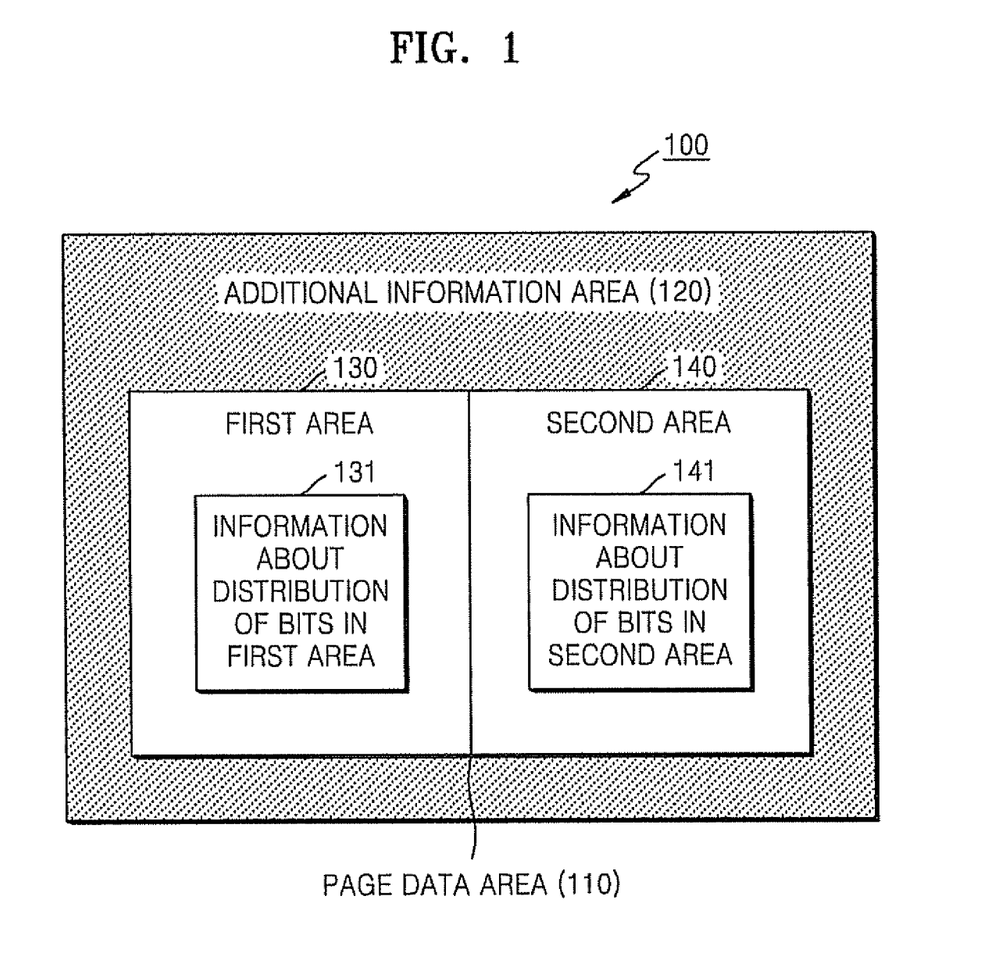
FIG. 1 shows a page recorded in a holographic information storage medium according to an embodiment of the present invention.

FIG. 1 shows a page 100 recorded in a holographic information storage medium according to an embodiment of the present invention. Referring to FIG. 1, the page 100 includes a page data area 110 and an additional information area 120. The page data area 110 is an area in which user data is recorded, and the additional information area 120 is an area in which address information, or the like, of the page 100 is recorded. The page data area 110, according to the current embodiment, is divided into at least one sub area. Information about the distribution of bits included in each sub area is recorded in that sub area. As shown in FIG. 1, the page data area 110 is divided into two sub areas: a first sub area 130 and a second sub area 140. Information 131 about the distribution of bits in the first sub area 130 is recorded in the first sub area 130, and information 141 about the distribution of bits in the second sub area 140 is recorded in the second sub area 140. Information about the distribution of bits in each sub area 130, 140 refers to information about bit 0 and bit 1 in each sub area 130, 140. Such information about the distribution may be shown in known patterns determined according to the distribution of bits.

For example, when the rate of bit 0 and bit 1 in a certain sub area is 5:1, known patterns, in which the rate of bit 0 and bit 1 is 5:1, are determined and the page 100 is generated by including the known patterns in the sub area. Also, the information about bit 0 and bit 1 included in each sub area 130, 140 may be recorded in the additional information area 120. The information about bit 0 and bit 1 may be the rate of bit 0 to bit 1 or the numbers of bit 0 or bit 1.

According to the current embodiment, a predetermined unit of data recorded in the holographic information storage medium is divided into sub areas 130, 140, and information on the distribution of bits in each sub area 130, 140 is arranged in the corresponding sub area 130, 140. That is, a data unit other than the page may be divided into at least one sub area.

Figure 2:
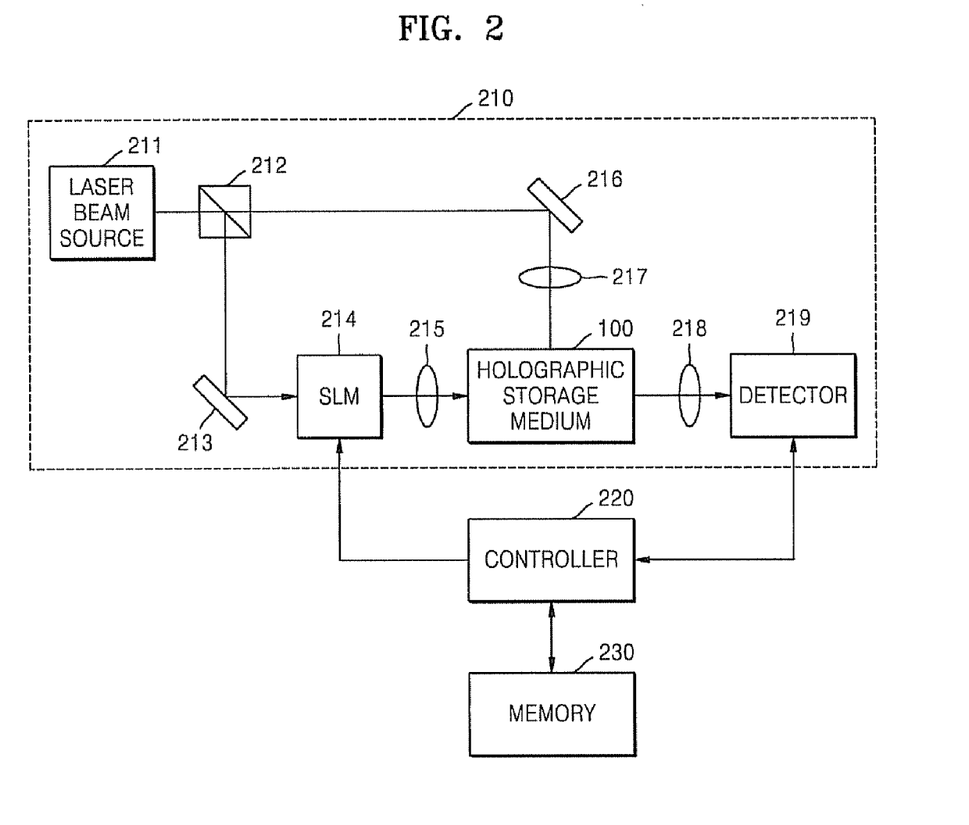
FIG. 2 is a block diagram of a holographic recording/reproducing apparatus according to an embodiment of the present invention.

FIG. 2 is a block diagram of a holographic recording/reproducing apparatus according to an embodiment of the present invention. As shown in FIG. 2, the holographic recording/reproducing apparatus includes an optical processor 210, a controller 220, and a memory 230. The optical processor 210 includes a holographic information storage medium 100. The controller 220 controls the optical processor 210 to record data on the holographic information storage medium 100 or to reproduce data from the holographic information storage medium 100. The memory 230 temporarily stores data read from the holographic information storage medium 100 or data that is to be recorded in the holographic information storage medium 100. The optical processor 210 further includes a laser beam source 211, a beam splitter 212, a first reflector 213, a spatial light modulator (SLM) 214, a first lens 215, a second reflector 216, a second lens 217, a third lens, and a detector 219.

The controller 220 controls the optical processor 210, generates and transmits data pages, including recorded data, to the optical processor 210, and processes a signal read from the optical processor 210. The controller 220, according to the current embodiment, generates a page, which is divided into sub areas and arranges information about the distribution of bits included in each sub area in the corresponding sub area, controls the optical processor 210 so that the generated page is recorded in the holographic information storage medium 100, and converts inputted soft values to output soft values with reference to the information about the distribution of bits in each sub area of the page while reproducing data from the holographic information storage medium 100.

While recording data on the holographic information storage medium 100, a laser beam output from the laser beam source 211 is irradiated onto the beam splitter 212 which divides the laser beam into a reference beam and a signal beam. The signal beam is irradiated onto the SLM 214, which spatial light modulates (amplitude modulates) the signal beam. The modulated signal beam is concentrated on the holographic information storage medium 110 by the first lens 215. Meanwhile, the reference beam is reflected by the second reflector 216 and irradiated onto the holographic information storage medium 100 by the second lens 217. An interference pattern is formed when the signal beam and the reference beam overlap. The interference pattern is recorded on the holographic information storage medium 100 as a detailed dense phase pattern.

The controller 220 according to the current embodiment determines known patterns based on the information about the distribution of bits in each sub area aligned in the corresponding sub area of the page, and aligns the page according to the known patterns. The controller 220, which controls a recording method according to the present invention, is illustrated in detail in FIG. 3. The controller 220 will be described later.

In order to reproduce data recorded on the holographic information storage medium 100, a luminance beam, which is identical to the reference beam used to record the data page that is to be reproduced, is irradiated onto the holographic information storage medium 100 in order to reproduce data as a diffraction beam, which corresponds to the interference pattern recorded on the holographic information storage medium 100. The diffraction beam is concentrated by the third lens 218 onto the detector 219, which is a charge coupled device (CCD) or a complementary metal-oxide semiconductor (CMOS). A reproduction signal output from the detector 219 is transmitted to the controller 220.

The controller 200 obtains the information about the distribution of the bits in each sub area, for example, a reference value which distinguishes between on pixels off pixels included in the sub area, using the known patterns in each sub area, in order to convert the input soft values in the sub area to the output soft values.

Figure 7:
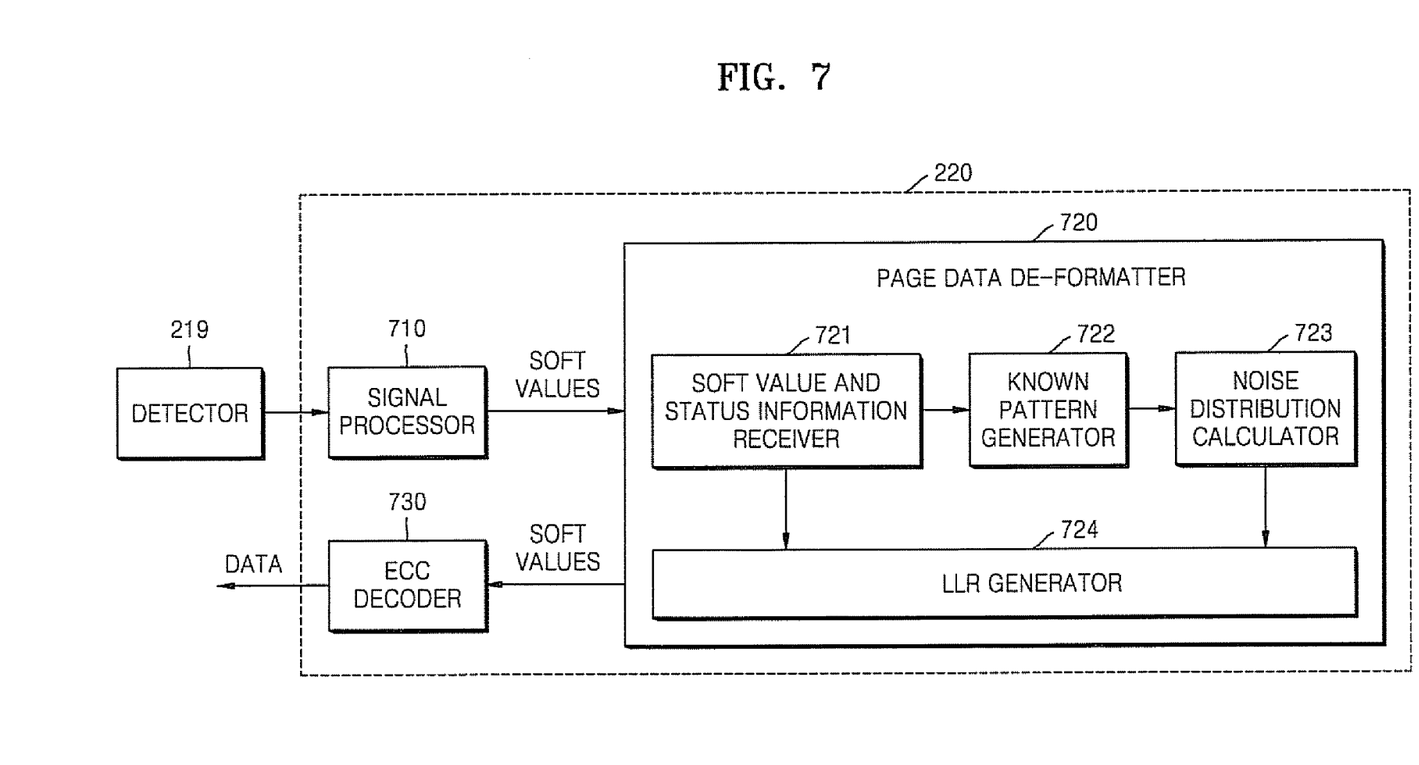
FIG. 7 is a block diagram of a reproducing apparatus according to an embodiment of the present invention.

The controller 220 which controls the reproducing method of the present invention is illustrated in detail in FIG. 7. The controller 220 will be described in detail later.

Figure 3:
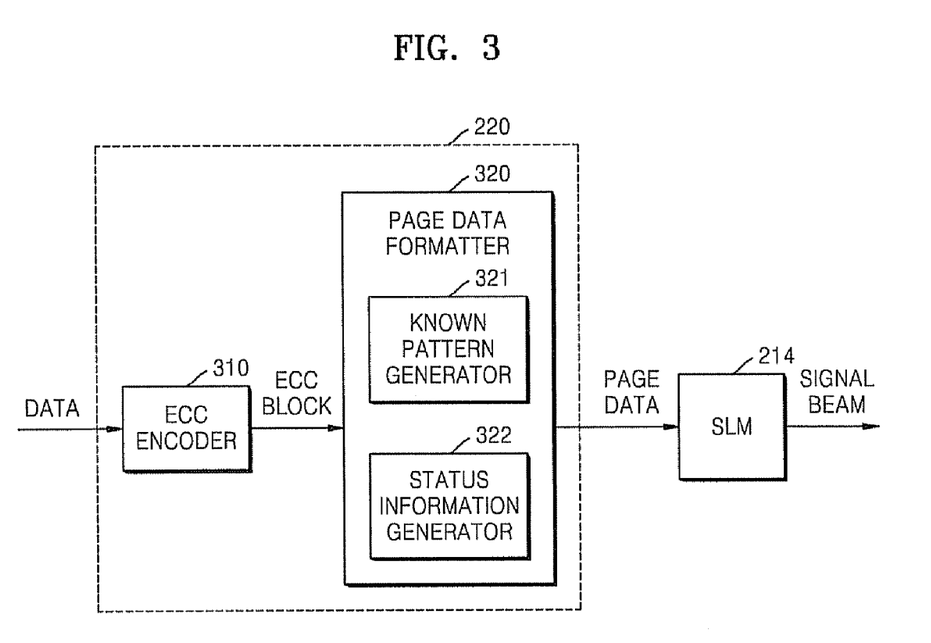
FIG. 3 is a block diagram of a recording apparatus according to an embodiment of the present invention.

FIG. 3 is a block diagram of a recording apparatus according to an embodiment of the present invention. As shown in FIG. 3, the recording apparatus includes a controller 220 and an SLM 214. The controller 220 includes an ECC encoder 310 and a page data formatter 320. The ECC encoder 310

ECC encodes data that is to be stored in a holographic information storage medium. Here, the data is generated via a series of processes, such as an EDC, a scrambling, adding data ID, etc. using a code for error correction in order to generate an ECC block. The ECC block is then outputted to the page data formatter 320. The page data formatter 320 blends the received ECC block and the known pattern in order to output page data to the SLM 214. The SLM 214 forms the page data into a signal beam and outputs the signal beam to record the signal beam on a holographic information storage medium.

The page data formatter 320 includes a known pattern generator 321 and a status information generator 322. The page data formatter 320 receives the ECC block and generates record unit data that is to be recorded in the holographic information storage medium from the ECC block. The size of the record unit data is not limited, and, according to embodiments of the invention, is data that is organized in page units. Hereinafter, it will be understood that the record unit data is organized in page units. The page data formatter 320 divides the page unit data into at least one sub area, and forms page data by arranging a known pattern determined according to information about bits in each sub area in the corresponding sub area.

The known pattern generator 321 generates the known pattern that is to be aligned in each sub area. The known pattern generator 321 obtains rate information of bit 0 and bit 1 by counting the numbers of bit 0 and bit 1 included in each sub area, and generates the known patterns determined according to the rate information of bit 0 and bit 1.

The status information generator 322 generates status information including number information of bit 1 and bit 0 included in each sub area or the rate information of bit 1 and bit 0, as necessary. Then, the page data formatter 320 prepares the page data further containing the status information and outputs the page data.

A method of determining the known patterns will now be described in detail. The known patterns are determined according to the information of bit 0 and bit 1 included in each sub area. Also, the known patterns may be determined with further reference to address information of a page. The page is multiplexed in order to form a book. A physical or logical address is allocated to indicate the book, and a page address is allocated to each page of the book. Also, the rate information of bit 0 and bit 1 is divided into various types, for example, 21 types such as 0:20, 1:19, through 20:0.

Each page is divided into a plurality of sub areas that stored the known pattern. The known patterns in each sub area include an offset by a page address of the page and are determined according to the rate information closest to the actual rate of bit 0 and bit 1 in the sub area. That is, the known patterns are determined by the page address and the rate information of bit 0 and bit 1.

For example, it is assumed that the book is formed of 100 pages, the page addresses are from 1 to 100, there are 10 types of rates of bit 0 and bit 1, and an offset of a page address is the remainder of the page addresses divided by 10. Here, the possible offset in the book is 10 and there are 10 types of rate information of bit 0 and bit 1. Thus, there are a total of 100 types of known patterns. Further, 10 known patterns exist according to the offset for each type of rate information of bit 0 and bit 1. In other words, even when a certain sub area of page 1 and a corresponding sub area of page 2 have the same rate information of bit 0 and bit 1, the offsets of that sub area of page 1 and the corresponding sub area of page 2 are different. Thus, different known patterns are determined. These known patterns are different despite the identical rate information of bit 0 and bit 1 in order to reduce cross-talk between the pages.

Figure 6:
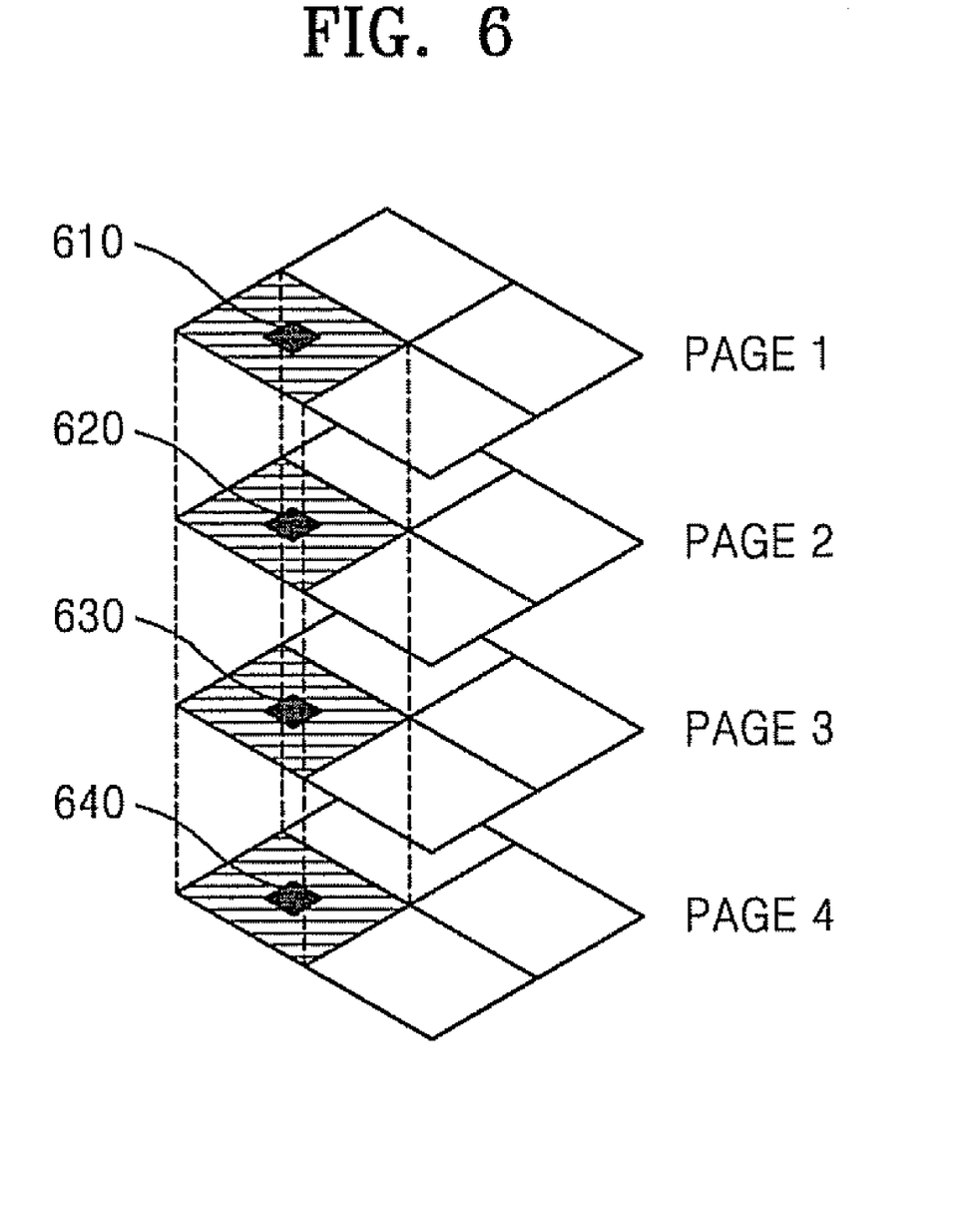
FIG. 6 is a diagram for describing a cross-talk between pages.

FIG. 6 is a diagram describing cross-talk between pages. In FIG. 6, pages 1 through 4 are divided into 4 sub areas, and known patterns are arranged in each sub area. When the rate of bit 0 and bit 1 in a sub area on the same location of each of the pages 1 through 4 is the same, known patterns 610 through 640 of each of the pages 1 through 4 are found to have the same pattern. Thus, cross-talk may be increased. Accordingly, by differentiating known patterns according to the page offset, identical known patterns on adjacent pages are prevented. For example, in FIG. 6, when a page offset is the remainder of a page address divided into 4, the pages 1 through 4 have different page offsets. Consequently, even when rate information of bit 0 and bit 1 in a sub area on the same location of each page are the same, the known patterns have different patterns. Also, when a page offset is the remainder of a page address divided by 2, the pages 1 and 3 have the same page offset, i.e. 1, and the pages 2 and 4 have the same page offset, i.e. 0. When the sub areas of the pages 1 and 3 having the same offsets have the identical rate information of bit 0 and bit 1, the identical known patterns are determined for the pages 1 and 3. However, even when the sub areas of the pages 1 and 2 having different offsets have the identical rate information of bit 0 and bit 1, different known patterns are determined for the pages 1 and 2. Accordingly, adjacent pages do not have the same known patterns even when the sub areas on the same location have the identical rate information of bit 0 and bit 1.

Meanwhile, when a modulation to fix the rate of bit 1 in a predetermined data unit is applied while recording a page, the status information generator 322 of FIG. 3 is not required since the rate of bit 0 and bit 1 in a page that is to be recorded is always fixed. Here, a known pattern having a fixed rate of bit 0 and bit 1 and an offset by a page address is generated. In the above example, when 10 offsets exist, there are 10 types of known patterns.

Figure 4:
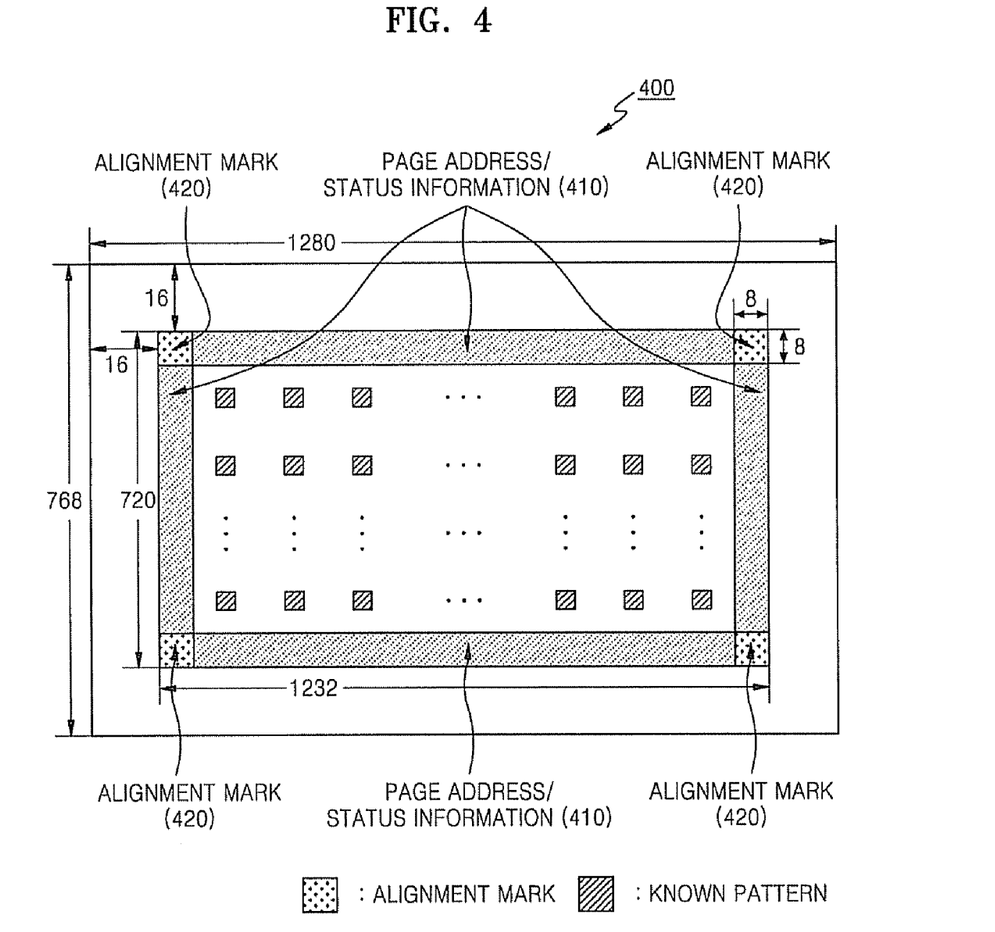
FIG. 4 shows a page data format in which known patterns are recorded according to an embodiment of the present invention, when the size of a spatial light modulator (SLM) is 768×1280.

FIG. 4 shows a page data format in which known patterns are recorded, according to an embodiment of the present invention, when the size of an SLM 400 is 768×1280. Alignment marks 420, which are formed of an 8×8 array to arrange page data, are disposed on the 4 outer corners of the page data, and a page address and status information 410, which includes rate information of bit 0 and bit 1, are aligned on each of the 4 sides of the page. The page address and status information 410 may be ECC encoded. As an example of a method of ECC encoding, 1 bit corresponds to 8×1 pixels, and when the 1 bit is 1, 8×1, i.e. 8 pixels are all turned on, and when the 1 bit is 0, 8×1, i.e., 8 pixels are all turned off, such as in a repetition code.

Example 1

Figure 5:
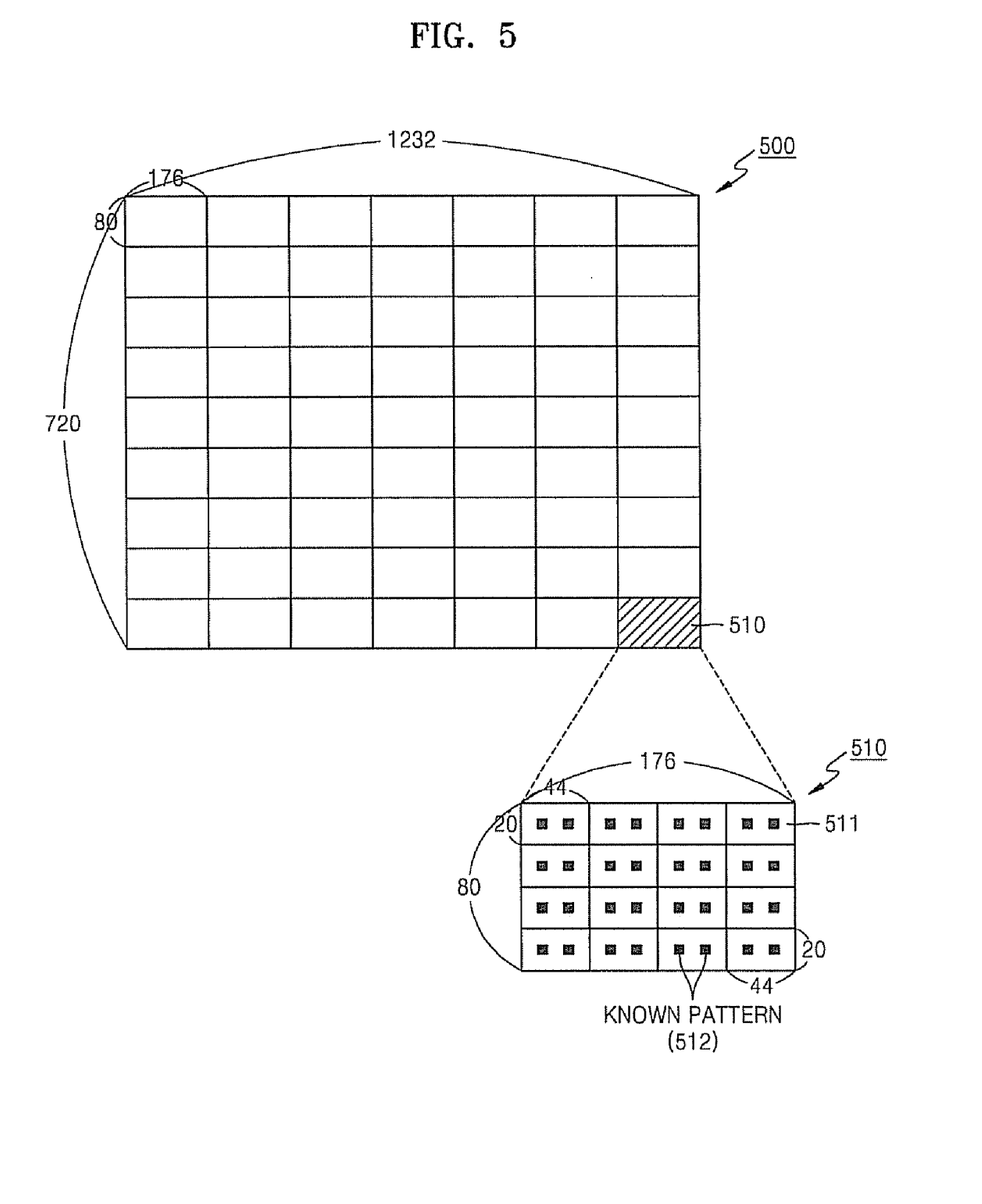
FIG. 5 illustrates in detail a 80×176 array illustrated in FIG. 4.

There are 17 types of rates of bit 0 and bit 1: 0:16, 1:15, 2:14, through 15:1, and 16:0, and 10 types of offsets of a page address. As shown in FIG. 5, page data 500 in a 720×1232 array is divided into 63 areas, each an 80×176 array 510. Rate information of bit 0 and bit 1 in each 80×176 array 510 is stored in status information, and 32 known patterns 512 are generated. Each known pattern is determined based on the rate information of bit 0 and bit 1 and the offsets of a page address. Each known pattern is a 4×4 array. The 80×176 array 510 is divided into 16 sub areas, each formed of a 20×44 array 511. Two known patterns 512 are stored in each 20×44 array 511, and the size of the known pattern 512 is 4×4=16 pixels.

Example 2

There are 10 types of rates of bit 0 and bit 1: 0:9, 1:8, 2:7 through 8:1 and 9:0, and 10 types of offsets of a page address. Page data in a 720×1232 array is divided into 28 areas, each a 180×176 array. Rate information of bit 0 and bit 1 in each 180×176 array is stored in status information, and 72 known patterns are generated. Each known pattern is determined based on the rate information of bit 0 and bit 1 and the offsets of a page address. Each known pattern is a 3×3 array. One known pattern is stored in each 20×22 array, and the size of the known pattern is 3×3=9 pixels.

While storing the rate information of bit 0 and bit 1 in the status information, the rate information may be efficiently shown, for example, by showing how many bit 1's or bit 0's are in the whole set of bits. In other words, when the rate information is divided into 10 types, the number of bits stored in the status information may be reduced by showing information that the whole set of bits is 9, and the rate information of bit 1 (2 when 2:7, and 3 when 3:6) when the whole set of bits of each area is 9.

FIG. 7 is a block diagram of a reproducing apparatus according to an embodiment of the present invention. As shown in FIG. 7, the reproducing apparatus includes a detector 219 and a controller 220. The controller 220 includes a signal processor 710, a page data de-formatter 720 and an ECC decoder 730. A reproduction signal, from the holographic information storage medium 100 of FIG. 2, is detected by the detector 219 and input to the signal processor 710. The signal processor 710 determines a location of page data using an alignment mark, and extracts and provides soft values, which show the intensity of beam in each pixel, a page address, and status information from the page data, to the page data de-formatter 720. A soft value and status information receiver 721 provides the received soft values and the status information to a known pattern extractor 722 and a log likelihood rate (LLR) generator 724. When the signal processor 710 directly transmits the soft values and the status information to the known pattern extractor 722 and the LLR generator 724, the soft value and status information receiver 721 may be omitted. The known pattern extractor 722 extracts soft values corresponding to locations where the known patterns are stored, from soft values of the page data. A noise distribution calculator 723 generates a known pattern based on an offset of the page address and rate information of bit 0 and bit 1 in each sub area in the status information, and calculates the mean and the standard deviation of bit 0 and bit 1 based on soft values of the extracted known pattern of each area. The LLR generator 724 calculates LLR values of the soft values of the page data using the rate information of bit 0 and bit 1 and the mean and standard deviation of bit 0 and bit 1 of each area calculated by the noise distribution calculator 723, and provides the LLR values to the ECC decoder 730. The ECC decoder 730 performs a soft repetitive decoding using the received LLR values and outputs the result. When the ECC decoder 730 decodes referring to a hard value, such as an RS code, instead of a soft value, the ECC decoder 730 may convert the input LLR values to hard values by zero slicing before decoding the LLR values, or the LRR generator 724 may convert the LLR values to hard values by zero slicing before outputting the LLR values.

Based on the characteristics of an LLR, when the likelihood of bit 1 is larger than the likelihood of bit 0, an LLR value is positive, and when the likelihood of bit 1 is smaller than the likelihood of bit 0, an LLR value is negative. Accordingly, when the LLR value is positive, the LLR value is hard decoded to 1 and when the LLR value is negative, the LLR value is hard decoded to 0.

The noise distribution calculator 723 calculates the mean and standard deviation of bit 0 and bit 1 in each area as follows.

The mean of soft values corresponding to locations where original data bits of known patterns in each area are 1, is the mean of bit 1, and the mean of soft values corresponding to locations where original data bits of the known patterns in each area are 0, is the mean of bit 0. The standard deviation of bit 1 is the mean of values in which differences between each soft value, corresponding to a location where the original data bit of a known pattern is 1, and the mean of bit 1 are squared. The standard deviation of bit 0 is the mean of values in which differences between each soft value, corresponding to a location where the original data bit of a known pattern is 0, and the mean of bit 0 are squared.

When the mean and the standard deviation of bit 0 in an area A are respectively $m0(A)$ and $\sigma 0(A)$, the mean and standard deviation of bit 1 in the area A are respectively $m1(A)$ and $\sigma 1(A)$, the rate of bit 1 is $1\_rate(A)$, and the rate of bit 0 is $0\_rate(A)$, an output $LLR(x)$ of a soft value x in the area A outputted by the LLR generator 724 is calculated as follows:

$$LLR(x)=\log(1\_rate(A)/0\_rate(A))+\log(\sigma 0(A)/\sigma 1(A))+(x-m0)^2/(2*\sigma 0^2)-(x-m1)^2/(2*\sigma 1^2),$$

wherein log denotes a natural log.

The above equation is based on the following theory.

Assuming that the mean and the standard deviation of bit 0 and bit 1 of a known pattern follow a Gaussian distribution and represent the mean and standard deviation of bit 0 and bit 1 of an area, the output $LLR(x)$ of the soft value x is $\log((\text{the number of cases when bit 1 has an x value})/(\text{the number of cases when bit 0 has an x value}))$.

Based on a Gaussian distribution of a noise characteristic of bit 0 and bit 1 of the known pattern, the number of cases when bit 1 has a value x is (the number of bit 1)*$(1/((2*\pi)^{1/2}*\sigma 1))*\exp(-(x-m1)^2/(2*\sigma 1^2))$ and the number of cases when bit 0 has a value x is (the number of bit 1)*$(1/((2*\pi)^{1/2}*\sigma 0))*\exp(-(x-m0)^2/(2*\sigma 0^2))$. Thus, the output LLR (x) can be calculated as above. With respect to the use of the above calculation with actual hardware, the output $LLR(x)$ may apply an approximate value according to the number of bits which shows the output $LLR(x)$.

A method of determining soft values of pixels included in each sub area will now be described. According to the method, number information of bit 0 and bit 1 in each sub area is used instead of a known pattern.

While a recording apparatus records data, a controller divides a page into at least one sub area and then stores number information of bit 1, number information of bit 0 or number information of bit 0 and bit 1 in each sub area as additional information. While a reproducing apparatus reproduces data, a controller aligns input signals and determines a slicing level thr_val which distinguishes bit 0 from bit 1 based on the number information of bit 1 in each area. Also, the mean of values larger than the slicing level thr_val is determined as the mean of bit 1 (mean 1) and the mean of values smaller than the slicing level thr_val is determined as the mean of bit 0 (mean 0). Accordingly, soft values of the input signals are output using the slicing level thr_val, mean 0 and mean 1.

Figure 8:
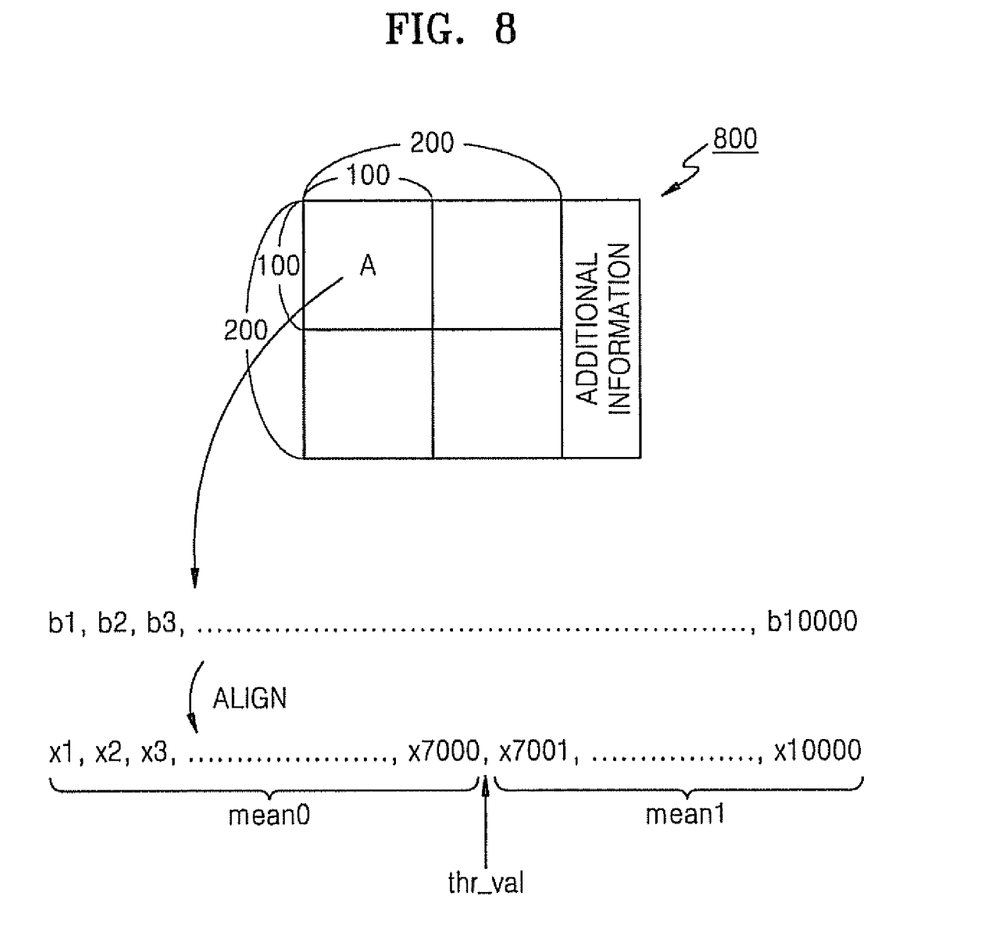
FIG. 8 is a diagram for describing a method of determining a soft value of pixels included in each sub area.

The method will be described in detail with reference to FIG. 8. Let's assume that the value of an input signal is a real number between 0 to 1024, a page 800 is formed of an additional information area and a page data area, the page data area is 200×200=40,000 pixels, that is 40,000 bits, the page 800 is divided into four areas of 100×100=10,000 pixels, that is 10,000 bits. Each area is called a sub area, and one of the sub areas is referred to as a sub area A.

From among the 10,000 bits stored in the sub area A, the number of bit 1 is counted, number information of bit 1 is included in the additional information area of the page 800, and then recorded on an information storage medium with page data. Here, as an example, it is assumed that the number of bit 1 is 3,000.

When the reproducing apparatus reproduces data, the number information of bit 1 (that is, 3,000 bits) in the sub area A is obtained from the additional information area by reading the page 800, input values (b1, b2, through to b 10,000 each having a real value between 0 to 1024) corresponding to 10,000 bits in the sub area A are arranged in an increasing order, and a slicing level thr_val is set from the 7,000th value and $7,001^{st}$ value. In detail, a value between x7,000 and x7,001 is determined as the slicing level thr_val, and the larger the slicing level thr_val, the higher the likelihood of a bit being 1.

When the mean of values from x1st to x7000th is 0 and the mean of values from x7,001 st to x1,0000st is 1, an output value LLR(bi), wherein i=1, 2, through to 10,000, of the input values may be determined using the following two methods.

According to a first method, the output value LLR(bi) is determined using a slicing level thr_val, mean 0 and mean 1.

The detailed example is as follows.
If (bi>thr_val)
LLR(bi)=c*pow((bi−thr_val)/(mean1−thr_val), r1);
else if (bi<thr_val)
LLR(bi)=c*pow((bi−thr_val)/(thr_val_mean0), r2);
else
LLR(bi)=0;
Here, c, r1, and r2 are positive real numbers.

According to a second method, the output value LLR(bi) is determined using a slicing level thr_val and an input value.
LLR(bi)=c*pow((bi−thr_val), r3);
Here, c and r3 are positive real numbers.

Figure 9:
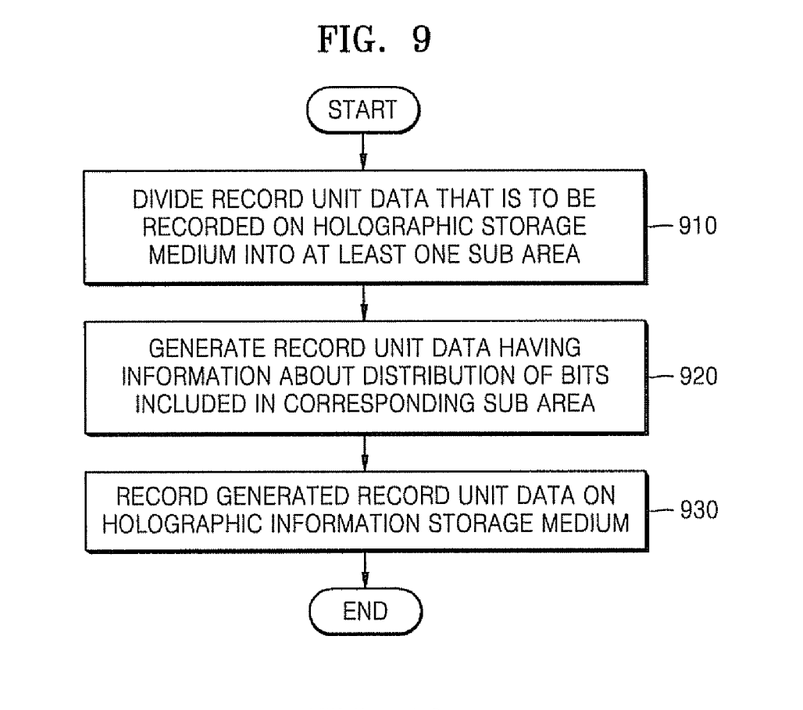
FIG. 9 is a flowchart illustrating a method of recording data in a holographic information storage medium according to an embodiment of the present invention.

FIG. 9 is a flowchart illustrating a method of recording data in a holographic information storage medium, according to an embodiment of the present invention. As shown in FIG. 9, record unit data that is to be recorded in a holographic information storage medium is divided into at least one sub area in operation 910. Then, the record unit data is generated so that information about a distribution characteristic of bits included in each sub area is included in each sub area in operation 920. The information about the distribution of bits included in each sub area may be a known pattern determined according to the distribution of bits included in each sub area. Next, the record unit data is recorded on the holographic information storage medium in operation 930.

Figure 10:
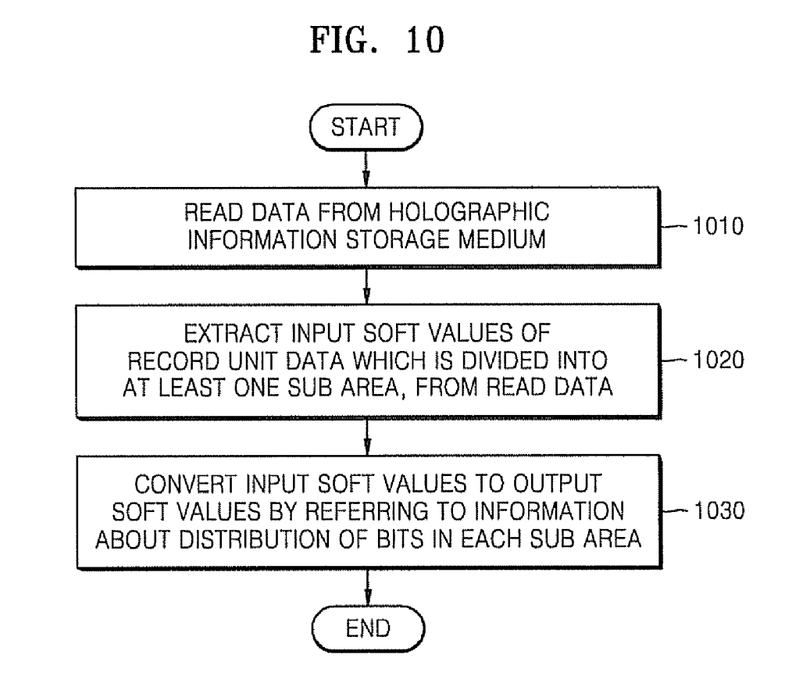
FIG. 10 is a flowchart illustrating a method of reproducing data from a holographic information storage medium according to an embodiment of the present invention.

FIG. 10 is a flowchart illustrating a method of reproducing data from a holographic information storage medium according to an embodiment of the present invention. As shown in FIG. 10, data is read from the holographic information storage medium in operation 1010. Then, an input soft value of record unit data, which is divided into at least one sub area, is extracted from the read data in operation 1020. Next, the input soft value is converted to an output soft value, referring to information about the distribution of bits included in each sub area, in operation 1030. Known patterns of each sub area are extracted as the information about the distribution of bits included in each sub area, and a reference value which distinguishes an on pixel from an off pixel in each sub area is obtained using the intensity of beam detected from the known patterns to determine on and off pixels based on soft values of the pixels in each sub area.

The performance of the conventional technology and the present invention will be compared with reference to Tables 1-4 below.

TABLES 1 to 4

(Random data having 50% of bit 1, standard deviation rate 3)

| | snr_dB | bER |
|---|---|---|
| Conventional Technology | 11.02324 | 0.01499367 |
| Present Invention | 16.97321 | 0.00216563 |

TABLE 2

(Random data having 50% of bit 1, standard deviation rate 5)

| | snr_dB | bER |
|---|---|---|
| Conventional Technology | 10.87391 | 0.01840163 |
| Present Invention | 22.33599 | 0.001120581 |

TABLE 3

(Random data having 25% of bit 1, standard deviation rate 3)

| | snr_dB | bER |
|---|---|---|
| Conventional Technology | 11.23909 | 0.01689663 |
| Present Invention | 14.75129 | 0.007041396 |

TABLE 4

(Random data having 25% of bit 1, standard deviation rate 5)

| | snr_dB | bER |
|---|---|---|
| Conventional Technology | 11.55932 | 0.01945231 |
| Present Invention | 18.47129 | 0.004061824 |

Tables 1 to 4 are simulation results showing improvements in snr and bER by the output LLR(x) above. Here, SNR=$(m1-m0)/(2*0\_rate*\sigma0^2+2*1\_rate*\sigma1^2)^{1/2}$, and snr_dB=$10*\log 10((m1-m0)^2/(2*0\_rate*\sigma0^2+2*1\_rate*\sigma1^2))$.

In the conventional technology, a bit error rate (bER) given by a zero slicing is shown, when bit 1 corresponds to 1 and bit 0 corresponds to −1, and then noise corresponding to the snr_dB is mixed. The present invention shows a bER in which a hard value is determined by zero slicing an snr_dB and LLR value of a signal where an input soft value is converted to an LLR value using rate, mean, and standard deviation of bit 0 and bit 1.

Tables 1 and 2 use random data in which the percentage of bit 1 in a 720×1232 page data is 50%. Tables 3 and 4 use random data in which the percentage of bit 1 in a 720×1232 page data is 25%.

The rate of the standard deviation of bit 0 and bit 1 in Tables 1 and 3 is 3. That is, the standard deviation of bit 1 is 3 times the standard deviation of bit 0, and the rate of the standard deviation of bit 0 and bit 1 in Tables 2 and 4 is 5. That is, the standard deviation of bit 1 is 5 times the standard deviation of bit 0. Also, the rate of known patterns is ⅟₃₅ (about 3%) of the entire page data, by using one 4×4 array for each 20×28 array.

Since the standard deviations of bit 0 and bit 1 are different, the distribution of LLR values is also asymmetrical. Accordingly, when converting the LLR values, the LLR values may be limited to a predetermined range. In the present invention of Tables 1 to 4, snr_dB is calculated under this method.

With reference to Tables 1 to 4, it may be seen that the snr and bER of the output LLR(x) are improved. In particular, when the difference between noise standard deviations of bit 0 and bit 1 is bigger and the difference between noise distributions of the areas in a page is larger, the relative effectiveness of the present invention is increased. Based on holographic data storage signal characteristics, the distribution of a beam reflected onto an SLM is Gaussian. In other words, the intensity of beam decreases from the center to the edges of the SLM. While recording a page, the on pixels at the edges of the page have a lower intensity than the on pixels at the center of the page. Thus, the standards for being on/off in the center and the edges are different. A beam is blocked in an off pixel but passes through an on pixel. Thus, only the on pixel is energetic. Also, noise is proportional to energy. Thus, the noise in an on pixel is bigger than the noise in an off pixel. In other words, the standard deviation of bit 1 is larger than the standard deviation of bit 0. This noise phenomenon is different from the noise phenomenon in conventional optical storage. Thus, the standard deviation of bit 0 and bit 1 according to the present invention may be adaptively obtained in order to process a signal.

Aspects of the present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

According to aspects of the present invention, a standard to distinguish bit 1 from bit 0 in data read from a holographic information storage medium can be prepared, and an information storage medium can be used adaptively. Also, the quality of a signal is improved. Thus, reliable data can be obtained while using the information storage medium.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A holographic information storage medium having at least one record unit data recorded thereon, the record unit data being divided into at least one sub area, wherein information about a distribution of bits included in the sub area is arranged in the sub area.

2. The holographic information storage medium of claim 1, wherein the information about the distribution comprises known patterns determined according to information about a bit 0 and a bit 1 included in the sub area.

3. The holographic information storage medium of claim 2, wherein the information about the bit 0 and the bit 1 comprises rate information of the bit 0 and the bit 1.

4. The holographic information storage medium of claim 2, wherein the known patterns are further determined according to an address of the record unit data.

5. The holographic information storage medium of claim 2, wherein additional information, including the information about the bit 0 and the bit 1, is further recorded in the record unit data.

6. The holographic information storage medium of claim 5, wherein the information about the bit 0 and the bit 1 comprises rate information of the bit 0 and the bit 1 or number information of the bit 0 and the bit 1.

7. An apparatus to record data on a holographic information storage medium, the recording apparatus comprising:
    an optical processor that records data on the holographic information storage medium and/or reads data from the holographic information storage medium; and
    a controller that generates record unit data from data that is to be recorded in the holographic information storage medium, the record unit data being divided into at least one sub area, wherein information about a distribution of bits included in the sub area is arranged in the sub area, and provides the record unit data to the optical processor.

8. The apparatus of claim 7, wherein the controller comprises a data generator to generate the record unit data, and
    the data generator comprises a pattern generator to generate known patterns that are determined according to information about bit 0 and bit 1, included in the sub area, as the information about the distribution.

9. The apparatus of claim 8, wherein the pattern generator generates the known patterns further determined according to address information of the record unit data.

10. The apparatus of claim 8, wherein the data generator further comprises an additional information generator to generate additional information including the information about the bit 0 and the bit 1, and to insert the additional information generated by the additional information generator into the record unit data.

11. The apparatus of claim 10, wherein the information about the bit 0 and the bit 1 comprises rate information of the bit 0 and the bit 1 or number information of the bit 1 and the bit 0.

12. An apparatus to reproduce data from a holographic information storage medium, the reproducing apparatus comprising:
    an optical processor to record data on the holographic information storage medium or to read data from the holographic information storage medium; and
    a controller to receive record unit data, read from the holographic information storage medium and divided into at least one sub area, from the optical processor, to reproduce the record unit data, and to determine bits arranged in the sub area by referring to information about a distribution of bits included in the sub area.

13. The apparatus of claim 12, wherein the controller comprises:
    a signal processor to extract a soft value, showing the intensity of beam in each pixel included in the record unit data, and an address of the record unit data;
    a record unit data divider to extract known patterns, determined according to information about bit 0 and bit 1 included in the sub area, as the information about the distribution from the sub area, and to generate information about soft values of the bits included in the sub area using the extracted known pattern; and an ECC decoder to perform error correction decoding based on the soft values output from the record unit data divider.

14. The apparatus of claim 13, wherein the record unit data divider comprises:
  a known pattern extractor to extract soft values, which correspond to the known patterns, from the sub area;
  a noise distribution calculator to determine a distribution characteristic of soft values of bits included in the sub area by using the soft values corresponding to the known pattern; and
  a log likelihood rate (LLR) generator to calculate an LLR value of the soft values included in the sub area using the distribution of the soft values.

15. The apparatus of claim 14, wherein the signal processor further extracts additional information, including rate information of the bit 0 and the bit 1 included in the sub area, from the record unit data.

16. The apparatus of claim 15, wherein the noise distribution calculator generates known patterns using the rate information of the bit 0 and the bit 1, and obtains the mean and the standard deviation of the bit 0 and the bit 1 included in the sub area by using soft values corresponding to the generated known patterns and the known patterns extracted from the sub area.

17. The apparatus of claim 14, wherein the controller comprises:
  a signal processor to extract a soft value showing the intensity of beam in each pixel included in the record unit data, and an address of the record unit data;
  a record unit data divider to extract additional information, including number information of the bit 0 and the bit 1 included in the sub area, as information about the distribution of the soft value from the record unit data, and to generate information about soft values of the bits included in the sub area using the additional information; and
  an ECC decoder to perform error correction decoding based on the soft values output from the record unit data divider.

18. A method of recording data on a holographic information storage medium comprising:
  generating record unit data from data to be recorded in the holographic information storage medium, the record unit data being divided into at least one sub area with information about a distribution of bits included in the sub area being arranged in the sub area; and
  recording the record unit data on the holographic information storage medium.

19. The recording method of claim 18, wherein the generating of the record unit data comprises generating known patterns, which are determined according to information about bit 0 and bit 1 included in the sub area, as the information about the distribution.

20. The recording method of claim 19, wherein the generating of the record unit data comprises generating the known patterns, which are further determined according to address information of the record unit data.

21. The recording method of claim 19, further comprising:
  generating additional information including the information about the bit 0 and the bit 1; and
  inserting the additional information into the record unit data.

22. The recording method of claim 21, wherein the information about the bit 0 and the bit 1 comprises rate information or number information of the bit 0 and the bit 1.

23. A method of reproducing data from a holographic information storage medium comprising:
  reading record unit data, divided into at least one sub area, from the holographic information storage medium; and
  reproducing the record unit data by determining bits arranged in the sub area by referring to the information about a distribution of the bits included in the sub area.

24. The reproducing method of claim 23, wherein the reproducing of the record unit data comprises:
  extracting a soft value, which shows the intensity of a beam in each pixel included in the record unit data, and an address of the record unit data;
  extracting known patterns, determined according to information about bit 0 and bit 1 included in the sub area, as the information about the distribution of the bits included in the sub area;
  generating information about soft values of the bits included in the sub area using the extracted known patterns; and
  performing error correction decoding using the information about the soft values of the bits included in the sub area.

25. The reproducing method of claim 24, wherein the generating of the information about soft values of the bits included in the sub area comprises:
  extracting soft values corresponding to the known patterns from the sub area;
  determining the distribution of soft values of the bits included in the sub area using the soft values corresponding to the known patterns; and
  calculating a log likelihood rate (LLR) value of soft values included in the sub area using the distribution of the soft values.

26. The reproducing method of claim 25, further comprising:
  extracting additional information, including the rate information of the bit 0 and the bit 1 included in the sub area, from the record unit data; and
  generating known patterns using the rate information of the bit 0 and the bit 1 and obtaining the mean and standard deviation of the bit 0 and the bit 1 included in the sub area using the known patterns and the soft values corresponding to the known patterns extracted form the sub area.

27. The reproducing method of claim 23, wherein the reproducing of the record unit data comprises:
  extracting a soft value, showing the intensity of beam in each pixel included in the record unit data, and an address of the record unit data;
  extracting additional information, including number information of the bit 0 and the bit 1 included in the sub area, as information about the distribution of the soft value from the record unit data, and generating information about soft values of the bits included in the sub area using the additional information; and
  performing error correction decoding using the information about soft values of the bits included in the sub area.

* * * * *